R. S. SMART.
TOOTH PASTE DISPENSING DEVICE.
APPLICATION FILED OCT. 24, 1914.
1,156,106.
Patented Oct. 12, 1915.
3 SHEETS—SHEET 2.
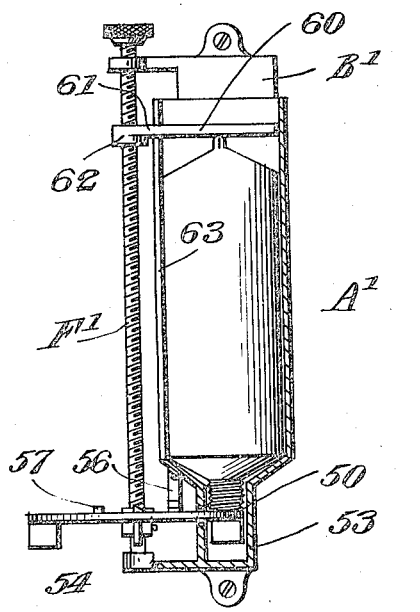
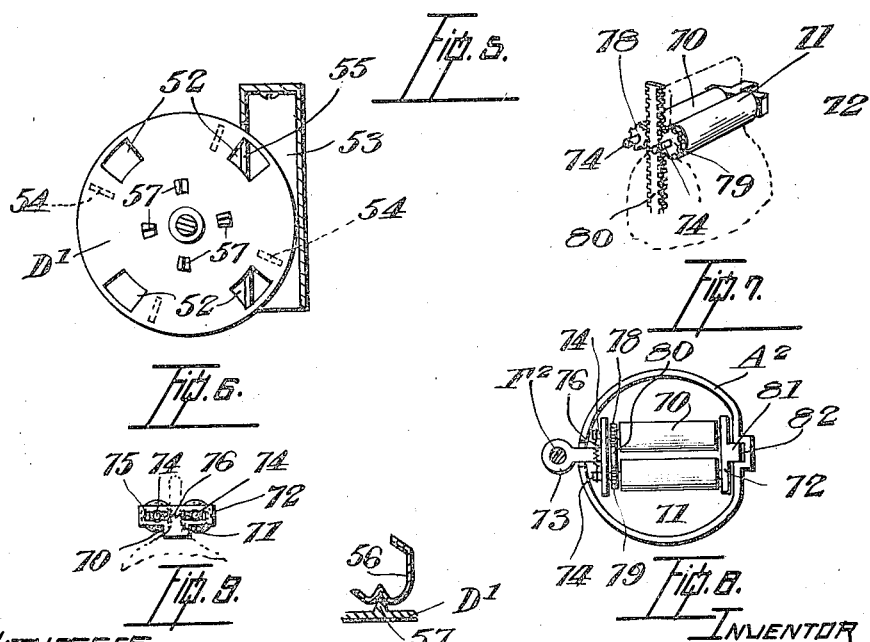
WITNESSES
INVENTOR
Russell S. Smart

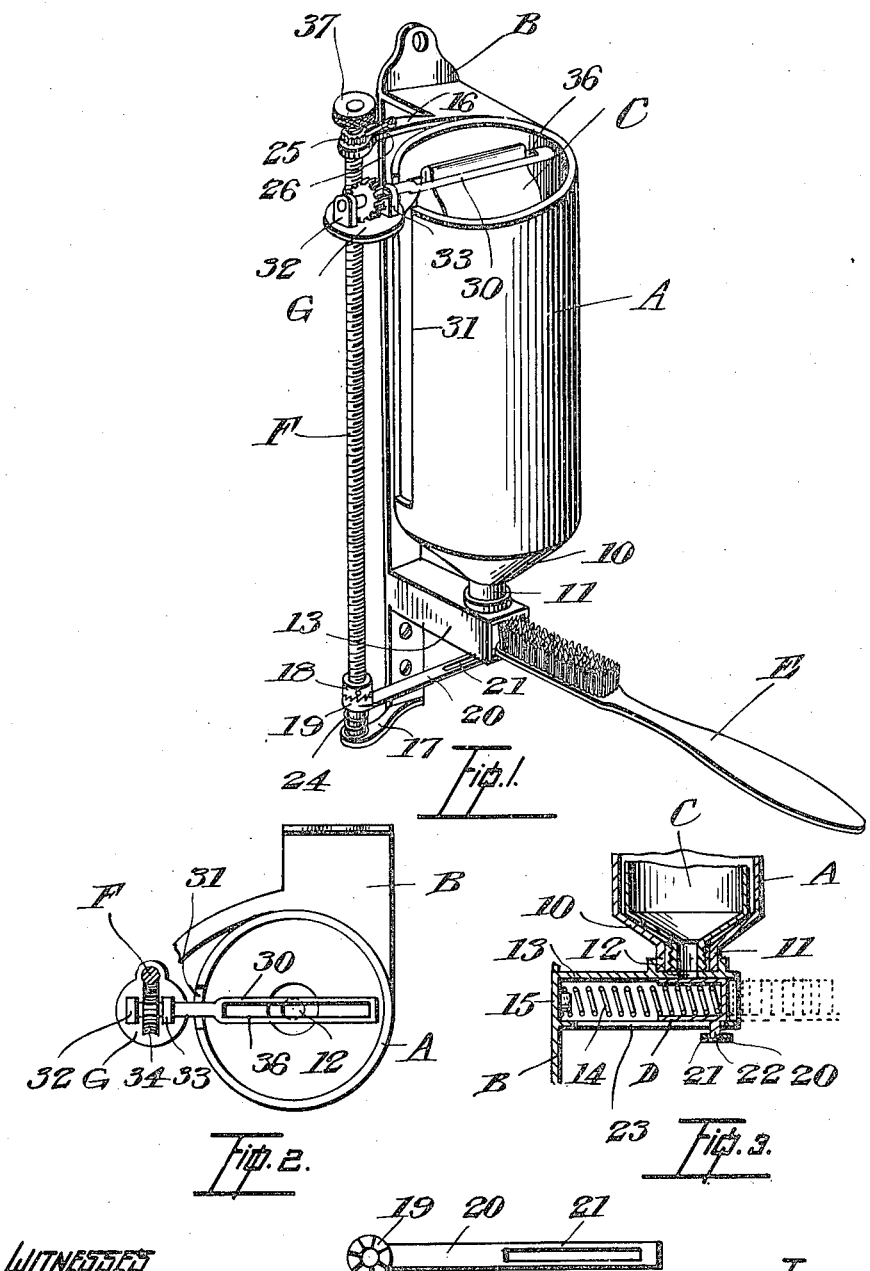

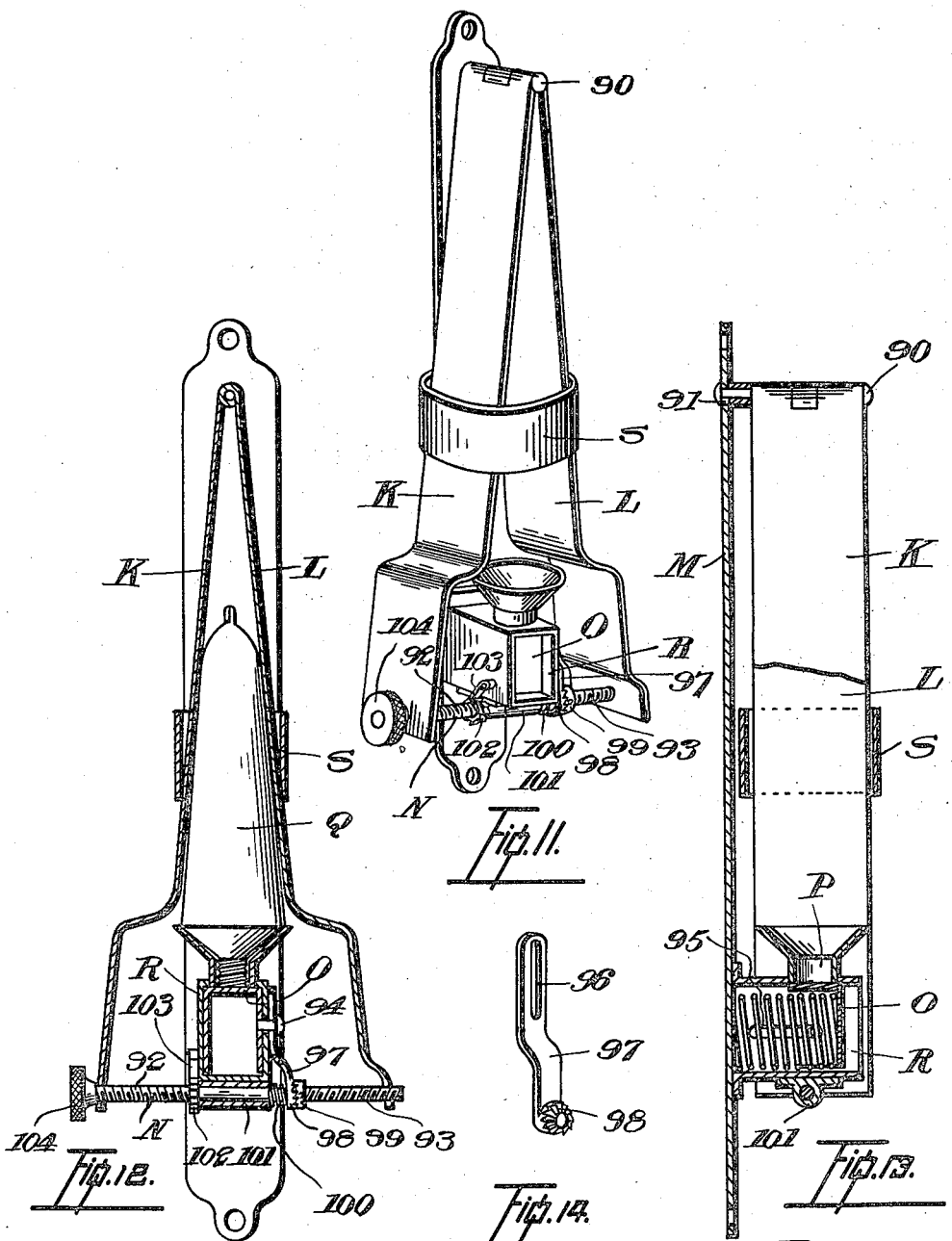

UNITED STATES PATENT OFFICE.

RUSSEL SUTHERLAND SMART, OF OTTAWA, ONTARIO, CANADA.

TOOTH-PASTE-DISPENSING DEVICE.

1,156,106.  Specification of Letters Patent.  Patented Oct. 12, 1915.

Application filed October 24, 1914. Serial No. 868,478.

*To all whom it may concern:*

Be it known that I, RUSSEL SUTHERLAND SMART, a subject of the King of Great Britain, and resident of Ottawa, in the Province of Ontario, Dominion of Canada, have invented certain new and useful Improvements in Tooth-Paste-Dispensing Devices, of which the following is a specification.

This invention relates to improvements in tooth paste dispensing devices, and the objects of the invention are to provide a simple and effective form of device for dispensing tooth paste from a collapsible tube and which will dispense a measured quantity of tooth paste directly onto the tooth brush, and to keep the opening in the tube closed when not in use so that the paste will not harden therein.

Tooth paste is almost universally sold in collapsible soft metal tubes having screw caps. In use, these screw caps are very readily lost and when lost the tooth paste hardens in the mouth of the tube, necessitating a greater pressure than usual to extrude a desired quantity of paste from the tube and frequently resulting in waste of the tooth paste. Where the cap is not lost, the time occupied in screwing it on and off each time the paste is to be used is considerable.

The present invention provides a simple and effective device operated by movement of the tooth brush in the user's hand by which a desired quantity of tooth paste is placed on the brush and the tube collapsed mechanically in such a manner as to use the paste economically.

The invention comprises the improved construction and coöperative arrangements of parts hereinafter described in detail in the accompanying specification and drawings.

In the drawings, Figure 1 is a perspective view of an embodiment of the invention. Fig. 2 is a plan view of the form shown in Fig. 1. Fig. 3 is a sectional detail taken through the delivery valve. Fig. 4 is a detail of the slotted lever connecting the valve with the feeding mechanism. Fig. 5 is a sectional view through an alternative form of the invention. Fig. 6 is a detail in plan of the delivery valve in the alternative form of the invention. Fig. 7 is a perspective detail of an alternative form of device for collapsing the tube. Fig. 8 is a detail in plan of the form of the invention shown in Fig. 7. Fig. 9 is a side view of the device shown in Fig. 8. Fig. 10 is a detail of a spring detent device used in the form shown in Figs. 5 and 6. Fig. 11 is a perspective view of an alternative form of the invention. Fig. 12 is a transverse vertical sectional view. Fig. 13 is a vertical section taken at right angles to Fig. 12. Fig. 14 is a perspective view of the operating lever.

In the drawings like characters of reference refer to like parts in all the figures.

The invention comprises as its principal elements a container into which the collapsible tube of tooth paste or the like is adapted to be inserted, a controlling valve for the delivery of the paste and means for collapsing the tube which are operated by or from the delivery valve, the valve itself being operated by an intromittent member, such as the end of a tooth brush.

In the form shown in Fig. 1, the container A is in the form of a cylinder of metal or other suitable material supported from a wall bracket B preferably in vertical position. The container is shaped to receive a collapsible tube C of tooth paste or the like of usual dimension, the end of the container in this embodiment of the invention being formed with a frusto-conical portion 10 adapted to receive a corresponding portion on the tube and a cylindrical neck 11 into which the neck of the tube is adapted to extend. The valve member D is mounted below the neck 11 and adapted to control the opening 12 in the neck, being supported in the embodiment illustrated in a guideway 13 which is shaped to receive the end of a tooth brush E. The valve member is in the form of a slide valve, spring held in outermost position by means of a compression spring 14 extending from the valve member to the closed end 15 of the guideway. It will be seen that as the valve member is moved inwardly, the opening 12 constituting the discharge mouth of the container will be opened so that the paste or the like may pass downwardly onto the upturned end of the inserted tooth brush. At the same time pressure is adapted to be exerted on the tooth paste tube to collapse it by means which are operated through the agency of the tooth brush itself. Such means in the embodiment illustrated are operated directly from the valve member and comprise a screw threaded spindle F mounted in lugs 16 and 17 on the bracket B and free to turn therein, the spindle being provided near the bottom with a ratchet wheel 18 which turns with the spindle, adapted to engage a corresponding ratchet 19 formed on or attached to the extremity of the lever 20, the opposite end of such lever being formed with a slot 21 through which a pin 22 on the valve member extends, such pin projecting downwardly through a slot 23 in the guideway. The ratchet 19 is loose on the spindle F and is held in engagement with the ratchet 18 by a spiral compression spring 24 extending between the ratchet 19 and the lug 17. Friction will ordinarily prevent turning of the spindle on the return movement of the ratchet 19, but if this is not sufficient a ratchet 25 and spring pawl 26 may be provided for this purpose. The spindle F has mounted thereon means which are adapted to exert a pressure in a longitudinal direction on the collapsible tube C and also to squeeze said tube from the end and to wind the end up. These means comprise a bracket member G mounted on the spindle and adapted to be moved longitudinally by turning of the spindle, a turning member 30 being mounted on the bracket G and extending transversely of the container A and projecting through a longitudinal slot 31 in the container, the turning member being journaled in suitable lugs 32 and 33 on the bracket member and being provided with a worm pinion 34 which engages the screw threaded spindle F and is turned thereby. The turning member is formed with means to engage the end of the tube C, said means comprising a longitudinal slot 36 through which the end of the tube may be inserted as shown in Fig. 1. The spindle F may be provided for conveniently turning it manually with a thumb nut 37. In the operation of this form of the invention the cap is removed from the tube of tooth paste when it is placed in the container in inverted position, the end being engaged with the turning member 30 as shown. When it is desired to use a quantity on a tooth brush the end of the tooth brush is inserted in the guideway 13 and pressure is exerted in a longitudinal direction on the tooth brush forcing the valve D inwardly, at the same time turning the spindle F through the lever 20 and ratchets 18 and 19 and thereby causing downward movement of the bracket G which will exert a pressure in a longitudinal direction on the tube C and at the same time wind it up through the means of the turning member 30. Since the mouth of the container is open the tooth paste will be extruded onto the end of the brush E which may then be withdrawn and used. If a greater quantity of tooth paste is desired the end of the brush may be inserted a second time.

In the alternative form of the invention shown in Figs. 5 and 6 the container A', bracket member B', and spindle F' are of similar form. The valve member D' is, however, in the form of a disk mounted on the lower end of the spindle and having its periphery passing beneath the mouth 50 of the container, the valve member being formed at intervals with slots 52 near the periphery and arranged in pairs diametrically opposite to each other, the said slots being designed to register at intervals with the mouth 50 to permit feeding of the tooth paste. The member D' is adapted to be turned by the end of the tooth brush inserted in the guideway 53 and which is adapted to engage one of a plurality of downwardly depending vanes 54 formed on the disk D', the walls of the guideway being formed with a suitable slot 55 adapted to permit passage therethrough of the disk and vanes. The valve member D' is adapted in this form of the invention to be turned exactly a quarter revolution at each insertion of the tooth brush and will be held in proper position after each movement by means of a spring 56 having an end shaped to engage with one of four teeth 57 formed on the upper side of the disk, a detail of such spring and teeth being shown in Fig. 10. The feeding of the paste by collapsing the tube in this form of the invention is accomplished by means of a pressure member 60 in the form of a plate which fits the top of the container and is formed with an arm 61 carrying a short sleeve 62 which has screw threaded engagement with the spindle F', the arm 61 extending through a slot 63 in the side of the container. As the spindle F' is turned the member 60 will be moved longitudinally of the container and exert a pressure on the end of the tube which will force the paste therefrom, the collapsible tube being crushed in the container A'.

The alternative form of feeding device shown in Figs. 7, 8 and 9 includes pressure rollers 70 and 71 mounted in a bracket member 72 which is provided with a sleeve 73 mounted on the spindle F², the spindle and other operating parts of the invention being shown as in Figs. 1 to 4 or 5 and 6. The rollers are formed with pintles 74 which will extend in slots 75 in the end of the bracket member and the rollers may be drawn toward each other by a spring 76 engaging the opposite pintles at one end, as shown in Figs. 8 and 9. The rollers are adapted to be turned as they are moved downwardly with the bracket member by means of pinions 78 and 79 mounted on the rollers and adapted to engage opposite sides of a double rack 80 which is mounted within the container A². The bracket member may be further guided in its downward movement by means of a tongue 81 adapted to engage a guideway 82 formed in the side of the container. It will be seen that the ends of the tube will be gripped between the rollers and as the bracket member is moved downwardly on the spindle the rollers will be turned to squeeze between them the ends of the tube and to thereby extrude the material therefrom.

In the form shown now in Figs. 11 to 14, the tooth paste is adapted to be extruded from the tube by means of a lateral pressure. The container in this form of the invention is formed by two compressing members K and L which are pivoted together and to a pivot pin 90 at their upper extremity, the said pivot pin having slight vertical play in the slot 91 in the bracket member M. The lower extremities of the compressing members are adapted to be drawn simultaneously toward each other by the spindle N whose extremities 92 and 93 are threaded in opposite directions and extend through the compression members K and L. The spindle is operatively connected to the spring valve member O which is of form similar to that shown in Fig. 1 and operates below a discharge neck or hopper P which is adapted to receive the lower end of the collapsible tube Q which contains the paste. The valve member operates as before in the guideway R and is formed with a pin 94 extending through a slot 95 in the guideway and through a slot 96 in the operating lever 97, the lower extremities of the operating lever being formed with a ratchet 98 which is held in spring engagement with a fixed ratchet 99 on the spindle by means of a spring 100. The spindle member itself is journaled in a suitable bearing 101 on the bracket member and retrograde movement is prevented by means of a suitable ratchet 102 and pawl 103. The spindle member may be turned manually by means of a thumb nut 104. To assist in retaining the collapsible tube between the compression members K and L a sleeve S may be provided extending loosely around the compression member and adapted to be raised to admit the tube, the upward movement being limited by the head of the pin 90. In operation of this form of the invention, the movement of the valve member O will turn the spindle N, drawing the members K and L closer together and squeezing the tube Q. The lower parts of the members K and L are offset outwardly and shaped to conform to the bottom of the tube Q so that the maximum amount of paste may be squeezed therefrom.

The invention has been disclosed as applicable to the dispensing of tooth paste, but it will be evident that it might be used for dispensing other material onto any manually movable member. Any forms of the invention shown could be operated by any convenient form of intromittent member.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A dispensing device comprising a container adapted to receive a collapsible tube and formed with an opening through which material from the tube may be extruded, a valve member controlling the opening, a spindle adapted to be turned by the valve member and means operated by turning of the spindle for squeezing the sides of the collapsible container.

2. A dispensing device comprising a collapsible tube, a pair of compression members adapted to engage the sides of the collapsible tube, a valve member adapted to control the passage of material from the mouth of the tube, and means operated by the valve member for drawing the compression members closer together.

3. A dispensing device adapted to dispense a quantity of material onto a tooth brush or the like comprising a container for a tube of tooth paste or the like having an opening through which the paste or the like may be extruded, and means operable by the tooth brush or the like for exerting a pressure on the tube in a direction toward the opening to thereby extrude the tooth paste or the like through the opening onto the brush.

In witness whereof I have hereunto set my hand in the presence of two witnesses.

RUSSEL SUTHERLAND SMART.

Witnesses:
P. GARROW,
M. MAHONEY.